United States Patent
Best et al.

(10) Patent No.: US 7,865,461 B1
(45) Date of Patent: Jan. 4, 2011

(54) SYSTEM AND METHOD FOR CLEANSING ENTERPRISE DATA

(75) Inventors: Rob Best, Highlands Ranch, CO (US); Hossein Eslambolchi, Los Altos Hills, CA (US); John McCanuel, Bailey, CO (US); Prakash Vasa, Clarksburg, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 251 days.

(21) Appl. No.: 11/215,411

(22) Filed: Aug. 30, 2005

(51) Int. Cl.
*G06F 12/00* (2006.01)
(52) U.S. Cl. ...................................... 707/610; 707/609
(58) Field of Classification Search ........................ None
See application file for complete search history.

(56) References Cited

U.S. PATENT DOCUMENTS

| | | | |
|---|---|---|---|
| 6,081,806 A * | 6/2000 | Chang et al. ................... | 707/8 |
| 6,108,669 A | 8/2000 | Dalenberg et al. | |
| 6,578,052 B1 | 6/2003 | Mansour et al. | |
| 6,651,062 B2 | 11/2003 | Ghannam et al. | |
| 6,728,713 B1 | 4/2004 | Beach et al. | |
| 6,745,209 B2 | 6/2004 | Holenstein et al. | |
| 6,792,429 B2 | 9/2004 | Gilbert | |
| 6,823,350 B1 | 11/2004 | Mansour et al. | |
| 6,901,405 B1 | 5/2005 | McCrady et al. | |
| 2003/0115189 A1* | 6/2003 | Srinivasa et al. ............... | 707/3 |
| 2004/0225543 A1 | 11/2004 | Kapochunas et al. | |
| 2005/0015394 A1* | 1/2005 | McKeeth ..................... | 707/100 |
| 2005/0027717 A1 | 2/2005 | Koudas et al. | |
| 2005/0065823 A1* | 3/2005 | Ramraj et al. .................. | 705/3 |
| 2005/0131874 A1* | 6/2005 | Verbitsky ........................ | 707/3 |
| 2005/0172162 A1* | 8/2005 | Takahashi et al. .............. | 714/4 |
| 2006/0129843 A1* | 6/2006 | Srinivasa et al. ........... | 713/189 |
| 2007/0136782 A1* | 6/2007 | Ramaswamy et al. ....... | 725/138 |
| 2007/0206223 A1* | 9/2007 | Treibach-Heck et al. ... | 358/1.15 |
| 2008/0294977 A1* | 11/2008 | Friedman et al. ............ | 715/224 |

* cited by examiner

*Primary Examiner*—Apu M Mofiz
*Assistant Examiner*—Thu Nga Nguyen
(74) *Attorney, Agent, or Firm*—Hoffmann & Baron, LLP

(57) ABSTRACT

A method, system, and article of manufacture for cleansing an enterprise database extracts data from an enterprise database, extracts reference data from a most-trusted database, determines discords between the data extracted from the enterprise database and the reference data extracted from the most-trusted database in accordance with a set of business rules, modifies the data extracted from the enterprise database based on the discords, and stores the modified data in the enterprise database. The data may be modified automatically with or without manual intervention. Discords are preferably determined on an atomic level.

18 Claims, 4 Drawing Sheets

SYSTEM AND METHOD FOR CLEANSING ENTERPRISE DATA

BACKGROUND OF THE INVENTION

1. Field of the Invention

The present invention generally relates to database management, and more particularly to a database management system and method that cleanse enterprise data stored in a plurality of databases.

2. Brief Description of the Related Art

Storage of information in a storage medium is generally facilitated by using a database in conjunction with a database management system (DBMS). A database is a collection of related data that may be stored on a nonvolatile memory medium. Data in the database may be organized in a two-dimensional row-and-column form called a table. Databases typically include multiple tables.

A table is an object in the database having at least one record and at least one field within each record. Thus, a table may be thought of as an object having a two-dimensional record-and-field organization. A record is a row of data in the table that is identified by a unique numeric called a record number. A field is a subdivision of a record to the extent that a column of data in the table represents the same field for each record in the table. Each field in a record is identified by a unique field name, which remains the same for the same field in each record of the table. Therefore, a specific datum in a table is referenced by identifying a record number and a field name.

A database management system (DBMS) is a control system that supports database features including, but not limited to, storing data on a memory medium, and retrieving data from the memory medium. Data in the database is typically organized among a plurality of objects that include tables and queries. An individual table or query may be referred to as a record source since it is a source of data or records from the database. A query object is an executable database interrogation statement, command, and/or instruction that communicates to the database management system the identity and location of data being extracted from the database. The product of an executed query is called a result set. The result set may be stored and/or manipulated as a two-dimensional object similar to the table discussed previously.

A relational database is a commonly used database type that is managed by a database management system. Data in a relational database is distributed among multiple record sources that are typically related, or normalized, in a manner designed to minimize redundant data in the database, minimize the space required to store data in the database, and maximize data accessibility. Record sources in the database may be related to each another via key fields. A normalized database is one in which each record source in the database is directly related to at least one other record source in the same database by key fields.

The key field can be a primary key or a foreign key. A primary key is a field or combination of fields in a record source that includes unique data for each record in the table. A foreign key is any non-primary key in a record source that is the basis for a direct relation with any other record source. A database remains a relational database regardless of the degree of normalization that exists. Record sources in a normalized relational database are typically related. However, a relational database may be normalized even if the database is disconnected; in that at least one record source in the database is not related to any other record source by a key field.

Relationships between any two record sources in a relational database may be either direct or indirect. Such a relationship may also be referred to as a relation or join. A direct relationship exists between two record sources if there is no intervening record source in the relationship path between them. An indirect relationship exists if there is at least one intervening record source in the relationship path between two record sources.

The record sources in a relational database and the relationships between them define the geography of a database, which may be called the database schema. A sub-schema of the database is any subset of the full database schema, which is defined by a query, a result set of a query, or any other subset of record sources from the database. A database schema and database sub-schema may be displayed visually in graphic form as a graph having edges or arrows representing relationships between record sources, and vertices, also known as nodes or tables, representing the record sources at either end of a relationship.

Queries are used to access data in a database. The query may be constructed in accordance with the Structured Query Language (SQL), which may or may not be based on the American National Standards Institute (ANSI) standard SQL definition. To access data in a database, a user may construct a query using an SQL. Executing a query is called a join or joining wherein each relation identified in the query is joined during execution to retrieve the desired data from the database.

Metadata provides information concerning data in the database, such as how, when, and by whom the data is collected, and/or how the data is formatted. Metadata is important for understanding information stored in data warehouses and XML-based Web applications.

Data warehouses are collections of data that are adapted to support management decisions, such as an assortment of data providing a coherent view of business conditions at any given time. The development of a data warehouse includes development of systems to extract data in operating systems and installation of a warehouse database system to provide flexible access to the data. Data warehousing refers to the linking of different databases across an enterprise. An enterprise generally refers to any large business organization.

Enterprises are often forced to use and maintain a multitude of independent databases that may represent different views of the same or similar information. For instance, in the telecommunications industry, information concerning a particular network is often stored in various databases, which provide different organizations or views of the data taken at different times. Each of these databases is generally tailored to be most useful to the individual or department, such as sales, billing, ordering, or provisioning, intended to access them Over a period of time, information in these databases loses synchronization with, for instance, the physical network, which may be represented by the network database. The databases may also become inconsistent with each other through, for instance, failing to perform updates in a timely manner or simply not having the information available to revise a particular database at any given time. In the past, these inconsistencies were primarily corrected by manually browsing and fixing individual errors. However, this has proven to be a very inefficient process that is impractical to perform at regular intervals.

SUMMARY OF THE INVENTION

A method of cleansing an enterprise database formed in accordance with one form of the present invention, which incorporates some of the preferred features, includes extracting data from an enterprise database, extracting reference data from a most-trusted database, determining discords between the data extracted from the enterprise database and the data extracted from the most-trusted database in accordance with a set of business rules, modifying the data extracted from the enterprise database based on the discords, and storing the modified data in the enterprise database. The data may be modified automatically without manual intervention, and discords may be determined on an atomic level.

The method may also include determining discords between data extracted from the enterprise database and data extracted from the most-trusted database in accordance with an industry-standard database, modifying the data extracted from the enterprise database based on the discords, and storing the modified data in the enterprise database. The method may further include generating at least one of a cross-reference table and mapping information from metadata associated with the data extracted from the enterprise database and metadata associated with data extracted from the most-trusted database. Graphical user interfaces may be provided to enable manual correction of data extracted from the enterprise database, and manual entry or revision of the business rules.

A system for cleansing an enterprise database in accordance with one form of the present invention, which incorporates some of the preferred features, includes an enterprise database, a most-trusted database, and a computing device. The computing device extracts data from the enterprise database and reference data from the most-trusted database and determines discords between them in accordance with a set of business rules. The computing device modifies the data extracted from the enterprise database based on the discords, and stores the modified data in the enterprise database.

The enterprise database may include a contract database, account database, billing database, ordering database, or provisioning database, and the most-trusted database may include a network asset database. The computing device may determine discords on an atomic level.

The computing device may determine discords between the data extracted from the enterprise database and the data extracted from the most-trusted database in accordance with an industry-standard database, modify the data extracted from the enterprise database based on the discords, and store the modified data in the enterprise database. The computing device may generate at least one of a cross-reference table and mapping information from metadata associated with the data extracted from the enterprise database and metadata associated with data extracted from the most-trusted database.

An article of manufacture for cleansing an enterprise database in accordance with one form of the present invention, which incorporates some of the preferred features, includes a machine readable medium including at least one program, which when executed implements extracting data from an enterprise database, extracting reference data from a most-trusted database, determining discords between the data extracted from the enterprise database and the data extracted from the most-trusted database in accordance with a set of business rules, modifying the data extracted from the enterprise database based on the discords, and storing the modified data in the enterprise database.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Figure 1:
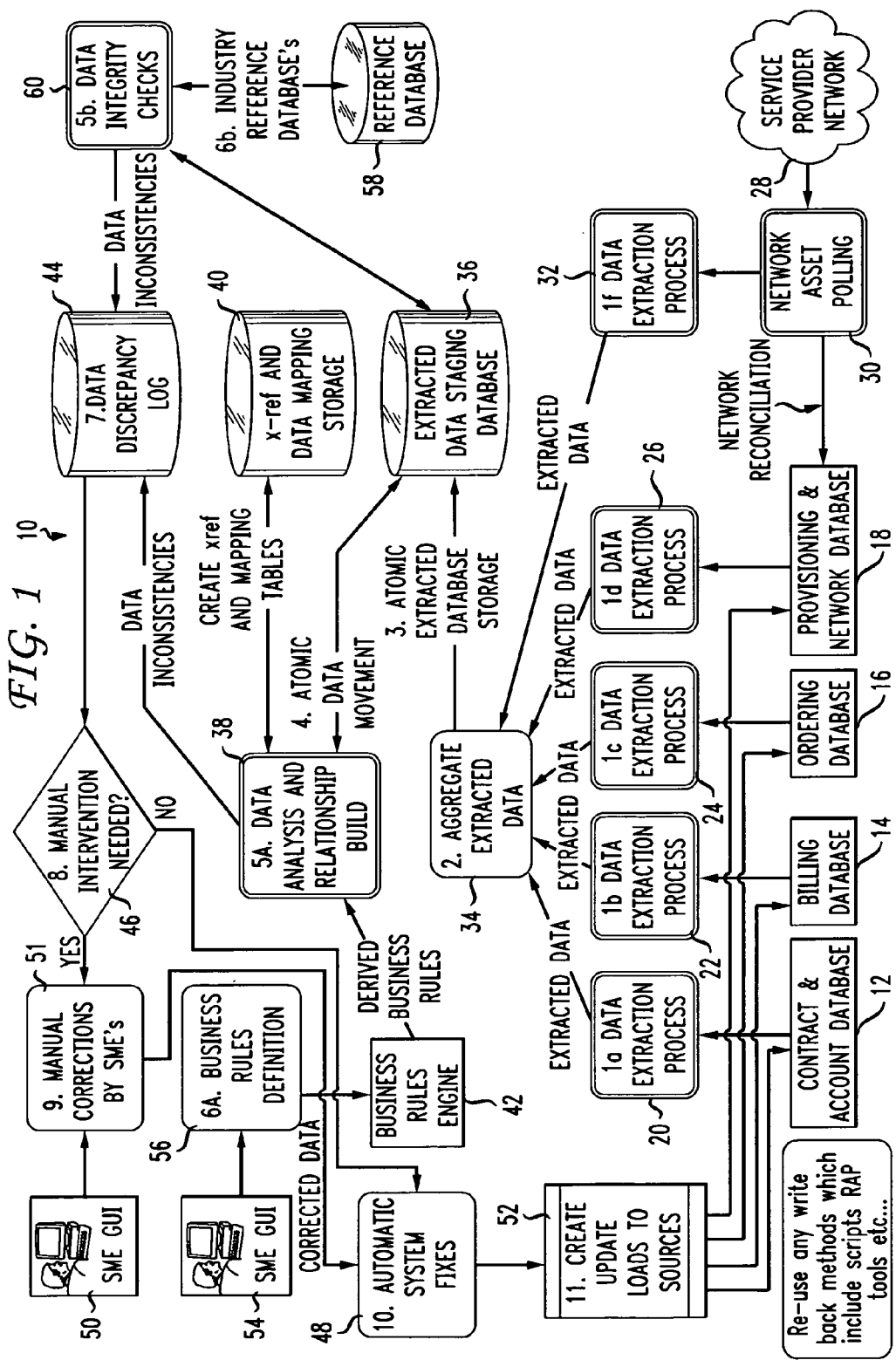
FIG. 1 shows a block diagram of a system for implementing a method of cleansing enterprise data formed in accordance with the present invention.

FIG. 1 shows a block diagram of a system 10 for implementing a method of cleansing enterprise data in accordance with the present invention. Each of the databases contains, for example, data concerning telecommunication network resources, the organization and content of which is tailored for the most efficient use by a particular department and/or individual.

Specifically, the system 10 incorporates a plurality of databases, such as a contract and accounting database 12, a billing database 14, an ordering database 16, and a provisioning and network database 18. Data is extracted from each of the databases 12, 14, 16, 18 by corresponding extraction processes 20, 22, 24, 26 that are flexible and well known in the art, such as file dumps, Open Database Connectivity (ODBC), and the like.

ODBC makes it possible to access any data from any application, regardless of which database management system (DBMS) is handling the data. ODBC manages this by inserting a middle layer, which is called a database driver, between an application and the DBMS. The purpose of this layer is to translate the application data queries into commands that the DBMS understands. For this to work, both the application and DBMS must be ODBC-compliant, that is, the application must be capable of issuing ODBC commands and the DBMS must be capable of responding to them.

The system also preferably includes a service provider network 28. Information concerning the resources in the service provider network 28 is preferably obtained through a network asset polling process 30, which provides network data to a corresponding extraction process 32. Data extracted from the network asset polling process 30 and the plurality of databases 12, 14, 16, 18 is preferably accumulated in a central location, such as an aggregate extracted database 34. The network access polling process 30 preferably provides a most-trusted data source or database, against which the remaining databases are preferably verified.

Data is preferably extracted on an atomic level from the aggregate extracted database 34 and temporarily stored in an extracted data-staging database 36. The word "atomic" is used herein to refer to indivisible and/or irreducible data, such that manipulation of such data must be performed entirely or not at all. Data stored in the extracted data-staging database 36 is also preferably moved on an atomic level to a data analysis and relationship build process 38, from which cross-reference tables and mapping tables are preferably generated and stored in a cross-reference and data mapping storage database 40. The data analysis and relationship build process 38 preferably utilizes relation-building functions, such as that disclosed in U.S. Patent Publication No. 2005/0027717, filed Apr. 21, 2004, which is incorporated herein by reference. The data analysis and relationship build process 38 is preferably adapted to operate on any dimension of data and/or format of database, such as flat files, relational files, hierarchical files, network files, and the like. The process 38 preferably flattens the extracted data into two (2) dimensions, if required.

A business rules engine and database 42 preferably provides a set of rules for determining discords between data extracted from the individual databases 12, 14, 16, 18 and data extracted from the most-trusted data source or network asset polling process 30. A discord is defined as a discrepancy or difference between data extracted from the individual databases and data extracted from the most-trusted data source, network asset polling process, or industry-standard database that, in accordance with the business rules or industry-standard database, is to be corrected or modified. The business rules may include, for example:

1. all circuit identifiers are to be shown in one format for reconciliation;
2. a frame port with a circuit with internal billing is to be considered a bundled offer;
3. a frame port may exist at one customer site and another customer can be billed for the port; and
4. all US addresses should have 5+4 zip code length.

The results of the analysis and/or comparison between data extracted from the plurality of databases and that provided by the network asset polling process 30 is preferably stored in a data discrepancy log database 44. Each of the discrepancies is then preferably subjected to a determination 46 regarding whether manual intervention is required or whether the discrepancy can be corrected by an automatic system correction process 48.

If manual intervention is required, a subject matter expert (SME) preferably provides manually entered corrections through a graphical user interface (GUI) 50, which is then applied to the automatic system correction process 48 by a manual correction process 51, as corrected data. An SME is usually responsible for a multitude of resources since their focus area may require a different dimension of the same data. For example, a Revenue Assurance SME is more focused on dollars-billed-to-service in the network, as compared to a Network Operations SME who is interested in ensuring that the customer assets are accurately related to the network infrastructure. The corrected data is preferably reformatted to the appropriate form, if required, in a create update loads to sources process 52 when cleaned or corrected data is ready to be written back to the database then loaded to the appropriate database. Corrected data is written back to the plurality of databases 12, 14, 16, 18 by means well known in the art, such as scripts, tools which perform screen scraping for main frames, and the like.

Entry and/or revision of the business rules database 42 is preferably performed by a graphical user interface 54, which provides business rule definitions 56 for entry into the business rules database 42.

As an additional verification process, data in an industry-standard reference database 58 (such as Dun & Bradstreet®, which provides legal status of the, names, and location; Map Info, which provides accurate location with latitude and longitude coordinates; Telecordia, which provides a standards database showing CLLI (common language location identifiers) codes for locations) may be used for analysis and verification of data residing in the extracted data staging database 36 by a data integrity check process 60. Discords found during this verification process are then preferably stored in the data discrepancy log 44 by the data integrity check process 60.

All or a portion of the process shown in FIG. 1 may be invoked manually on demand or automatically at predetermined times, such as during periods of relative inactivity concerning the databases, while remaining within the scope of the present invention. The entire process is intended to be completely reusable under a variety of circumstances with only limited redesign or modification, if necessary.

Figure 2:
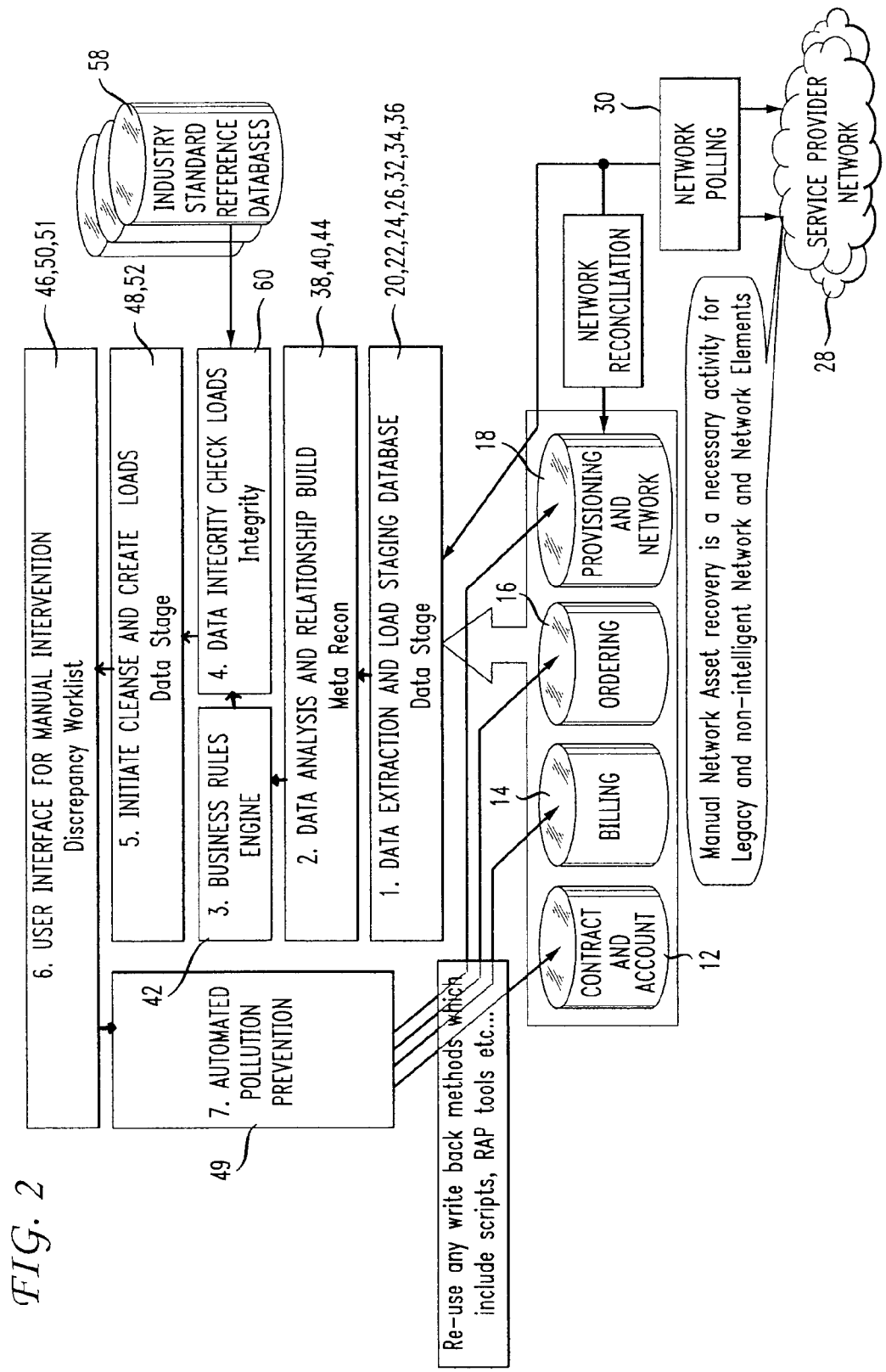
FIG. 2 shows a hierarchical chart of the flow of enterprise data as it passes through major components of the system shown in FIG. 1.

FIG. 2 shows a hierarchal chart of the flow of enterprise data as it proceeds through major components of the system shown in FIG. 1. Network resource information from the service provider network 28 is obtained by the network polling process 30 and provided to a data extraction and load staging component, which includes the data extraction processes 20, 22, 24, 26, 32 aggregate extracted database 34, and extracted data staging database 36 shown in FIG. 1, along with the data extracted from each of the plurality of databases 12, 14, 16, 18. The data is then applied to a data analysis and relationship build component, which includes the data analysis and relationship build process 38, cross-reference and data mapping storage database 40, and data discrepancy log 44 shown in FIG. 1. The data analysis and relationship build component preferably extracts metadata and builds cross-reference tables across the scoped extracts.

As indicated above in reference to FIG. 1, the data integrity check process 60 shown in FIG. 2 is preferably performed using industry-standard reference databases 58. The business rules engine 42 preferably applies rules to data provided by the data analysis and relationship build component to determine whether discrepancies are to be corrected. The discrepancies to be corrected are then written back to the databases 12, 14, 16, 18 by an initiate cleanse and create loads component, which includes the automatic system correction process 48 and database update process 52 shown in FIG. 1.

Discords may then be manually corrected by the user interface for manual intervention component, which includes the manual intervention determination 46, SME GUI 51, and manual correction process 51 shown in FIG. 1, followed by application to the automated system for revising the databases, if required. Alternatively, the discords may be corrected through an automated pollution prevention component, which includes the automatic system correction process 48 and database update process 52 shown in FIG. 1 to insert the corrected data into the source databases 12, 14, 16, 18.

Figure 3A:
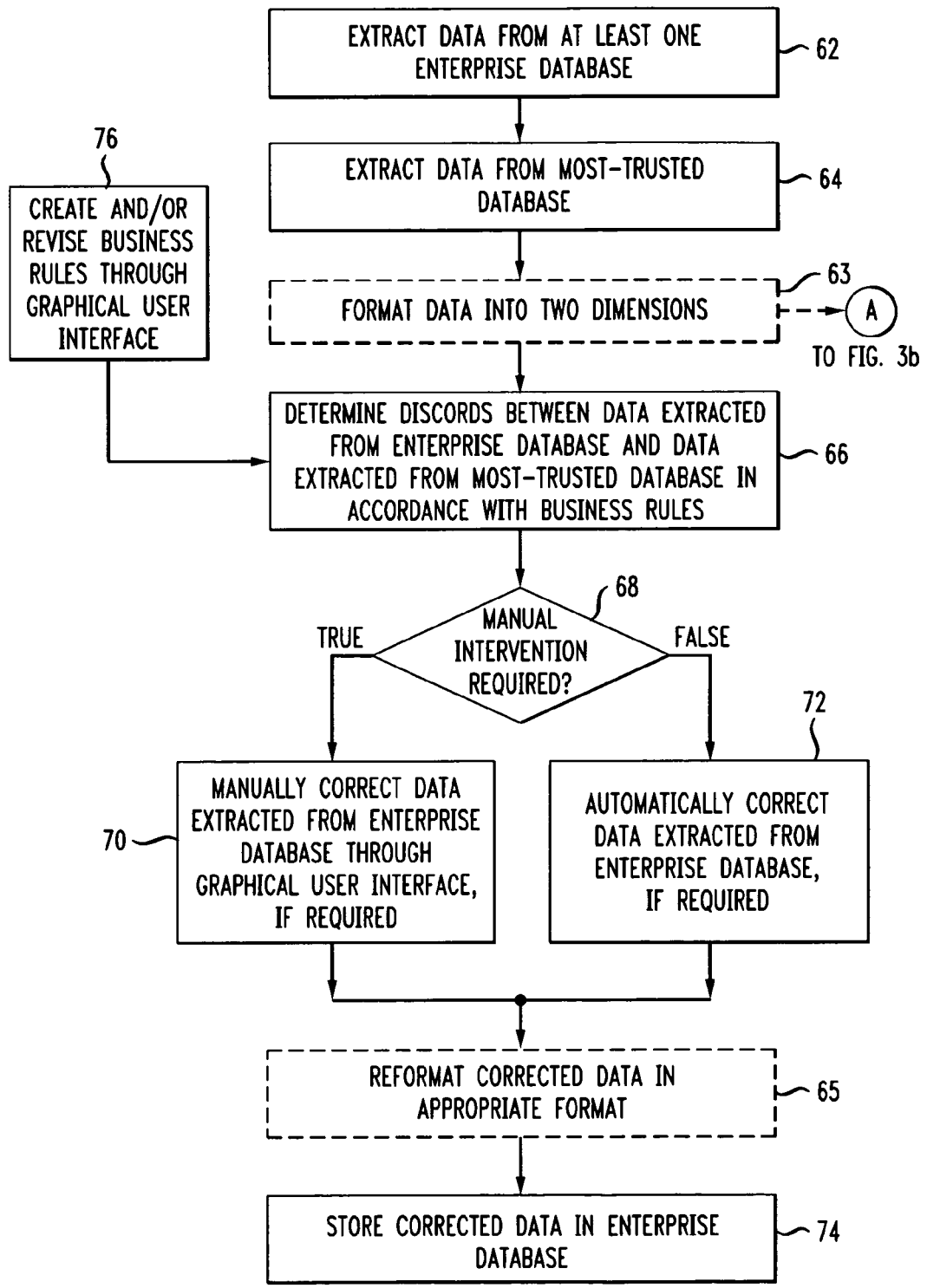
FIGS. 3a and 3b show a flow chart of a method of cleansing enterprise data formed in accordance with the present invention.
Figure 3B:
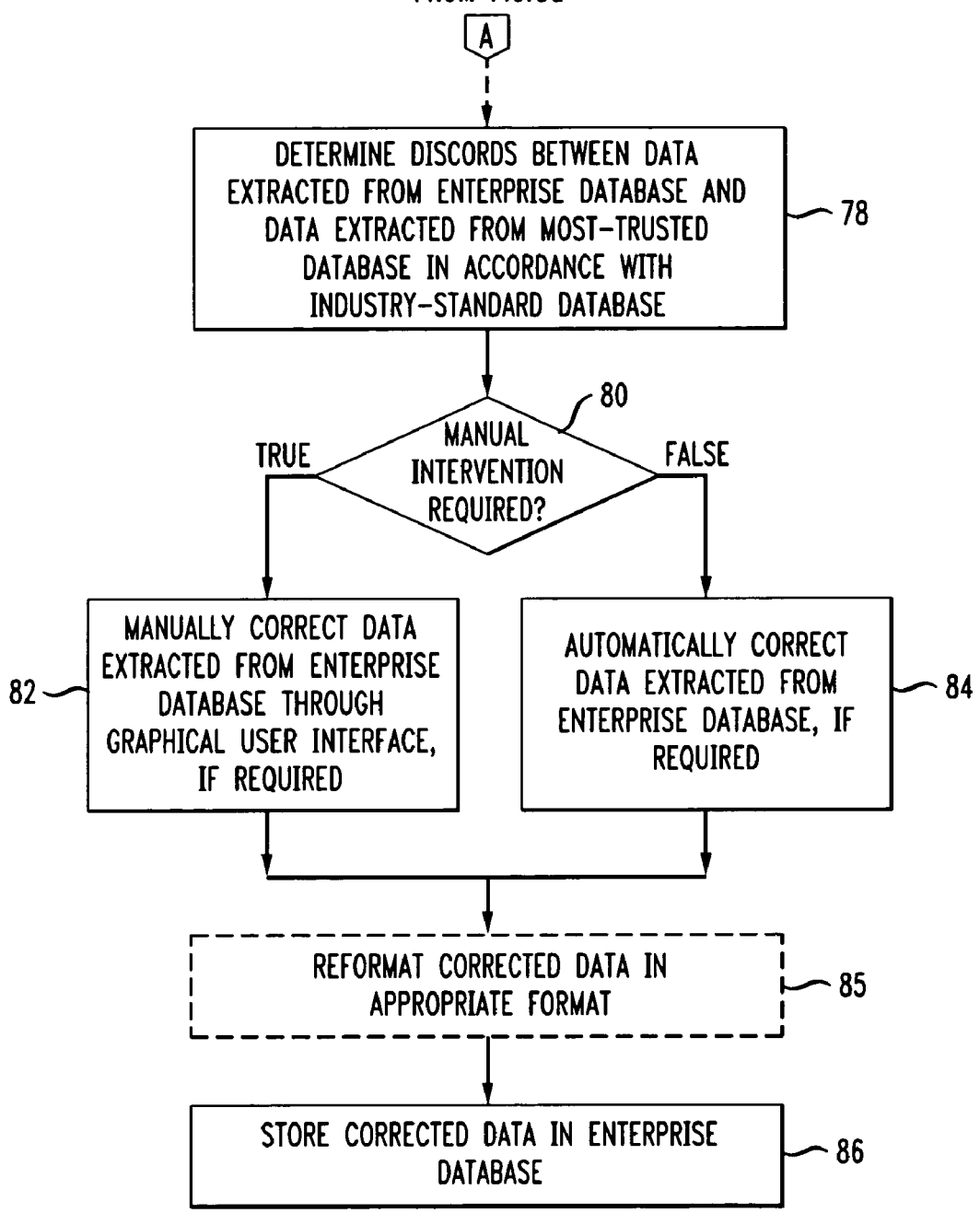

A pollution prevention component 49 is a measure to keep the cleansed data from going bad again. This is preferably accomplished by finding the root cause that is making the data erroneous, whether it is the system or people, and fixing the problem using either a modification request (MR) for the system or training for people. An MR to the system is a unit fix for each root cause. These fixes may be across one or many systems that show the same pollution symptoms FIGS. 3*a* and 3*b* show a flowchart of a method for cleansing enterprise data in accordance with the present invention. Data is preferably extracted from at least one of a plurality of enterprise databases in step 62, and data is extracted from a most-trusted database in step 64, such as the service provider network polling process. The method is preferably adapted to operate on any dimension of data and/or format of database, such as flat files, relational files, hierarchical files, network files, and the like. The method preferably flattens the extracted data into two (2) dimensions in step 63, and reformats the data back to the appropriate form in step 65 when cleaned or corrected data is ready to be written back to the database. For example, data initially stored in Lotus Notes® format, which are not row-and-column based is converted to a row-and-column format, cleaned, and then written back in the native Lotus Notes® format.

Discrepancies or discords are determined between data from the enterprise database and data from the most-trusted database in accordance with business rules in step 66 and, if manual intervention is required in step 68, the discords are manually corrected, if required, in step 70, preferably through a graphical user interface.

Alternatively, if manual intervention is not required in step 68, the data extracted from the enterprise database is automatically corrected, if required, in step 72. The corrected data is then reformatted in the appropriate format in step 65 and stored in step 74. Business rules are preferably created and/or revised through a graphical user interface in step 76.

Optionally, as shown in FIG. 3b, discords may be determined between data extracted from the enterprise database and data extracted from the most-trusted database in accordance with an industry-standard database in step 78. If manual intervention is required in step 80, the data extracted from the enterprise database is preferably manually corrected, if required, through the graphical user interface in step 82. Alternatively, if manual intervention is not required in step 80, the data is automatically corrected, if required, in step 84 and the corrected data is reformatted in the appropriate format and stored in the enterprise database in step 86.

Thus, the enterprise cleanse platform system and method:
1. support data cleanse activities;
2. provide a common platform that business and information technology (IT) personnel can use to manage and automate data cleanse activities;
3. allow users to capture, define, review, and maintain business rules used for data cleansing;
4. provide tools used to manage approval of business rules and updates;
5. provide summary reports by servicing categories of rules to find approved, updated and deleted rules; and
6. may be used in conjunction with other tools in the database tool set to provide inputs to the business rules.

Accordingly, the present invention enables synchronization and cleansing of enterprise data stored in a plurality of databases in accordance with a set of business rules using, for instance, a physical network, such as a telecommunication service provider network, as the most-trusted source of data. The present invention also enables manually invoked or automatic synchronization and cleansing of enterprise data stored in a plurality of databases. The present invention further enables synchronization and cleansing of all or a portion of the enterprise data stored in one or more databases in accordance with industry-standard reference databases. In this way, errors anywhere in the quote-to-cash process, that is, from the time a customer is provided with an estimate or quote of the service being provided to the time the customer pays for the service, can be resolved. This essentially avoids errors in billing and substantially improves the overall customer experience.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of cleansing a plurality of enterprise databases comprising:
    extracting data from a plurality enterprise databases;
    extracting reference data from a most-trusted database, the reference data being associated with resources in a service provider network;
    generating at least one of a cross-reference table and mapping information from metadata associated with the reference data extracted from the enterprise database and metadata associated with data extracted from the most-trusted database;
    accumulating the data extracted from the plurality of enterprise databases and the reference data extracted from the most-trusted database in an aggregate extracted database, from which discords are determined, the aggregate extracted database being independent of the plurality of enterprise databases and the most-trusted database;
    formatting the data extracted from the plurality of enterprise databases in a specified format;
    determining discords between the data extracted from the plurality of enterprise databases and the reference data extracted from the most-trusted database in accordance with a set of rules, the determining using the reference data extracted from the most-trusted database as a reference against which the data extracted from the enterprise database is verified;
    determining discords between the data extracted from the plurality of enterprise databases and industry standard data from an industry standard database, the data extracted from the plurality of enterprise databases being verified against the industry standard data of the industry standard database;
    determining whether at least one of the discords requires manual intervention or whether an automatic system correction process is configured to automatically correct the discords;
    modifying the data extracted from the plurality of enterprise databases automatically based on the discords and in response to a determination that the automatic system correction process is configured to automatically correct the discords;
    reformatting the data extracted from the enterprise database to an original format after modifying the data based on the discords; and
    storing the modified data in the plurality of enterprise databases.

2. A method of cleansing a plurality of enterprise databases as defined by claim 1, wherein modifying the data is performed automatically without manual intervention.

3. A method of cleansing a plurality of enterprise databases as defined by claim 1, wherein determining discords further comprises determining discords on an atomic level.

4. A method of cleansing a plurality of enterprise databases as defined by claim 1, further comprising:
    determining discords between the data extracted from the plurality of enterprise databases and the reference data extracted from the most-trusted database in accordance with an industry-standard database;
    modifying the data extracted from the plurality of enterprise databases based on the discords; and
    storing the corrected data in the plurality of enterprise databases.

5. A method of cleansing a plurality of enterprise databases as defined by claim 4, wherein modifying the data is performed automatically without manual intervention.

6. A method of cleansing a plurality of enterprise databases as defined by claim 1, further comprising providing a graphical user interface, the graphical user interface being adapted to enable manual modification of the data extracted from the plurality of enterprise databases.

7. A method of cleansing a plurality of enterprise databases as defined by claim 1, further comprising providing a graphical user interface, the graphical user interface being adapted to enable at least one of manual entry and modification of the set of rules.

8. A system for cleansing a plurality of enterprise databases comprising:
 a plurality of enterprise databases holding enterprise data;
 a most-trusted database holding reference data being associated with resources in a service provider network; and
 a computing device, the computing device configured to:
 extract enterprise data from the plurality of enterprise databases;
 extract the reference data from the most-trusted database;
 generate at least one of a cross-reference table and mapping information from metadata associated with the data extracted from the plurality of enterprise databases and metadata associated with reference data extracted from the most-trusted database;
 accumulate the data extracted from the plurality of enterprise databases and the reference data extracted from the most-trusted database in an aggregate extracted database, from which discords are determined, the aggregate extracted database being independent of the plurality of enterprise databases and the most-trusted database;
 format the data extracted from the plurality of enterprise databases in a specified format,
 determine discords between the enterprise data extracted from the plurality of enterprise databases and the reference data extracted from the most-trusted database in accordance with a set of rules, the computing device determining discords using the reference data extracted from the most-trusted database as a reference against which the enterprise data extracted from the plurality of enterprise databases is verified;
 determine discords between the data extracted from the plurality of enterprise databases and industry standard data from an industry standard database, the data extracted from the plurality of enterprise databases being verified against the industry standard data of the industry standard database;
 determine whether at least one of the discords requires manual intervention or whether an automatic system correction process is configured to automatically correct the discords;
 modify the enterprise data extracted from the plurality of enterprise databases automatically based on the discords and in response to a determination that the automatic system correction process is configured to automatically correct the discords;
 reformat the data extracted from the plurality of enterprise databases to an original format after modifying the data based on the discords; and
 store the modified enterprise data in the plurality of enterprise databases.

9. A system for cleansing a plurality of enterprise databases as defined by claim 8, wherein at least one of the plurality of enterprise databases comprises at least one of a contract database, account database, billing database, ordering database, and provisioning database.

10. A system for cleansing a plurality of enterprise databases as defined by claim 8, wherein the most-trusted database comprises a network asset database.

11. A system for cleansing a plurality of enterprise databases as defined by claim 8, wherein the computing device modifies the data automatically without manual intervention.

12. A system for cleansing a plurality of enterprise databases as defined by claim 8, wherein the computing device determines discords on an atomic level.

13. A system for cleansing a plurality of enterprise databases as defined by claim 8, wherein the computing device determines discords between the data extracted from the plurality of enterprise databases and the reference data extracted from the most-trusted database in accordance with an industry-standard database, modifies the data extracted from the enterprise database based on the discords, and stores the modified data in the plurality of enterprise databases.

14. A system for cleansing a plurality of enterprise databases as defined by claim 13, wherein the computing device modifies the data automatically without manual intervention.

15. A system for cleansing a plurality of enterprise databases as defined by claim 8, further comprising a graphical user interface, the graphical user interface being adapted to enable manual modification of the data extracted from the plurality of enterprise databases.

16. A system for cleansing a plurality of enterprise databases as defined by claim 8, further comprising a graphical user interface, the graphical user interface being adapted to enable at least one of manual entry and modification of the set of rules.

17. An article of manufacture for cleansing a plurality of enterprise databases comprising:
 a machine-readable medium comprising at least one program which when executed implements the steps of:
 extracting data from a plurality of enterprise databases;
 extracting reference data from a most-trusted database, the reference data being associated with resources in a service provider network;
 generating at least one of a cross-reference table and mapping information from metadata associated with the reference data extracted from the plurality enterprise databases and metadata associated with data extracted from the most-trusted database;
 accumulating the data extracted from the plurality of enterprise databases and the reference data extracted from the most-trusted database in an aggregate extracted database, from which discords are determined, the aggregate extracted database being independent of the plurality of enterprise databases and the most-trusted database;
 formatting the data extracted from the plurality of enterprise databases to a specified format;
 determining discords between the data extracted from the plurality of enterprise databases and the reference data extracted from the most-trusted database in accordance with a set of rules, the determining using the reference data extracted from the most-trusted database as a reference against which the data extracted from the plurality of enterprise databases is verified;
 determining discords between the data extracted from the plurality of enterprise databases and industry standard data from an industry standard database, the data extracted from the plurality of enterprise databases being verified against the industry standard data of the industry standard database;

determining whether at least one of the discords requires manual intervention or whether an automatic system correction process is configured to automatically correct the discords;

modifying the data extracted from the plurality of enterprise databases automatically based on the discords and in response to a determination that the automatic system correction process is configured to automatically correct the discords;

reformatting the data extracted from the plurality of enterprise databases to an original format after modifying the data based on the discords; and storing the modified data in the plurality of enterprise databases.

18. The method of claim 1, further comprising:

identifying a root cause of the discords; and addressing the root cause using a modification request to substantially prevent the discords from recurring after the modification.

* * * * *